United States Patent
Bonte et al.

(10) Patent No.: US 8,807,024 B2
(45) Date of Patent: Aug. 19, 2014

(54) BALE CHAMBER CONFIGURATIONS

(71) Applicant: CNH America LLC, New Holland, PA (US)

(72) Inventors: Xavier G. J. M. Bonte, Rzijzendijk (NL); Martin Roberge, Saskatoon (CA); Sandor Van Vooren, Sijsele-Damme (BE); Pieter Vandevelde, Sint Michiels Brugge (BE)

(73) Assignee: CHH Industrial America LLC, New Holland, PA (US)

( * ) Notice: Subject to any disclaimer, the term of this patent is extended or adjusted under 35 U.S.C. 154(b) by 0 days.

(21) Appl. No.: 13/742,290

(22) Filed: Jan. 15, 2013

(65) Prior Publication Data

US 2013/0180418 A1    Jul. 18, 2013

(30) Foreign Application Priority Data

Jan. 16, 2012   (BE) .................................. 2012/0032

(51) Int. Cl.
*A01F 15/08* (2006.01)
*B30B 9/30* (2006.01)

(52) U.S. Cl.
CPC ........... *A01F 15/0825* (2013.01); *B30B 9/3003* (2013.01); *B30B 9/3025* (2013.01)
USPC ......... 100/185; 100/188 R; 100/191; 100/242

(58) Field of Classification Search
CPC ..... A01F 15/0825; A01F 15/08; A01F 15/04; A01F 15/042; A01F 15/044; A01F 15/046; B30B 9/3025
USPC ......... 100/7, 147, 148, 185, 188 R, 189, 191, 100/192, 242; 56/341
See application file for complete search history.

(56) References Cited

U.S. PATENT DOCUMENTS

| | | | |
|---|---|---|---|
| 2,910,932 A | | 11/1959 | Wathen |
| 4,125,071 A | * | 11/1978 | Young ........................... 100/191 |
| 4,489,648 A | * | 12/1984 | Naaktgeboren ................ 100/191 |
| 4,788,901 A | * | 12/1988 | Klinner et al. ............. 100/188 R |
| 5,365,838 A | * | 11/1994 | Valentini ....................... 100/112 |
| 5,735,199 A | | 4/1998 | Esau et al. |
| 7,975,607 B2 | * | 7/2011 | Hoover et al. ................ 100/191 |
| 2010/0224085 A1 | | 9/2010 | Hoover et al. |

FOREIGN PATENT DOCUMENTS

DE   DD287188 A5   2/1991
EP   0745320 A1    12/1996

* cited by examiner

*Primary Examiner* — Jimmy T Nguyen
(74) *Attorney, Agent, or Firm* — Patrick M. Sheldrake; Seyed V. Shar (57) ABSTRACT

A baler for manufacturing bales of harvested crop material comprises a bale chamber comprising a first part where a plunger can make a reciprocating movement, and a second part which cannot be reached by the reciprocating plunger. The second part has a varying cross section along the length direction of the bale chamber, whereby the rate of change of the cross sections is different at multiple positions along the length direction of the second part of the bale chamber.

6 Claims, 5 Drawing Sheets

BALE CHAMBER CONFIGURATIONS

CROSS REFERENCE TO RELATED APPLICATIONS

This Patent Application claims priority under 35 U.S.C. §119 to BE 2012/0032 filed on Jan. 16, 2012 titled, "Improved Bale Chamber Configurations" and having Xavier Bonte, Martin Roberge, Sandor Van Vooren and Pieter Vandevelde as inventors. The full disclosure of BE 2012/0032 is hereby fully incorporated herein by reference.

FIELD OF THE INVENTION

The present invention generally relates to a baler for creating cuboid shaped bales of agricultural crop material. More particularly, the present invention relates to good, e.g. improved, bale chamber configurations, such configurations being suited for balers for manufacturing of high density bales of harvested crop material.

BACKGROUND OF THE INVENTION

An agricultural baler is a trailed machine (PTM—pulled type machine) used in agriculture for the purpose of creating bales of (typically) straw or other biomass such as hay, silage or similar crop material produced during a harvesting or mowing operation.

Various designs of balers have been proposed in the prior art. A common characteristic of virtually all balers is that they are most of the time towed behind agricultural vehicles such as tractors (or could be self-propelled). A baler includes an infeed via which biomass is ingested into the interior of the baler and compressed or otherwise treated to form bales. The completed bales are tied with twine or another lineal object to make them rigid and self-supporting, after which they are ejected via a discharge chute typically at the rear of the baler so as to fall or be placed on the ground behind the tractor/baler combination as it moves forwardly along a harvested field.

In a rectangular baler it is possible to adjust the bale density, as the baler includes a substantially cuboid bale-forming chamber. It is known in the art to construct the bale-forming chamber with one or more moveable walls. The positions of the walls can be adjusted so as to alter the volume of the bale-forming chamber and thereby squeeze the bale during its formation to a greater or lesser degree. If, as is commonplace in a baler, each charge or flake of ingested biomass is substantially of constant volume, causing a reduction in the volume of the bale-forming chamber in this way leads to the creation of higher density bales, and vice versa. This, in turn, provides an ability to control the densities of the formed bales.

In more detail, each charge introduced into the bale-forming chamber is, at the point of introduction, uncompressed or compressed to a relatively low level. It is moved along the bale-forming chamber by longitudinal strokes of a piston or plunger that reciprocates under the action of an attached arm that in turn is driven by a bell crank e.g. secured to a rotating member. Each stroke of the piston therefore compresses an amount of biomass against the biomass already available in the bale-forming chamber. In consequence, the density of the formed bale increases if the volume into which the biomass is swept is reduced as a result of adjustments of the positions of the walls of the chamber at locations "downstream" of the furthest point reached by the piston during its motion.

The dimensions of cuboid shaped bales, however, are substantially fixed, firstly because of the cross-sectional dimensions of the bale-forming chamber and secondly because the baler forms the biomass into identical bale lengths that are ejected via the discharge as substantially identical, individual bales.

In WO2010/100068 the need is disclosed for an approach to apply tension to a bale in a bale-forming chamber of an agricultural baler to enable control of the bale characteristics (in particular the length of bales, especially for small cuboid shaped bales, to facilitate efficiency of use of bale handling equipment) in a consistent way. As described therein, the thickness and density of the bale are directly influenced by the amount of crop material delivered to the plunger for each stroke thereof and the resistance applied to the bale being formed in the chamber behind the plunger. Resistance applied to the bale in the chamber is commonly controlled by variations in the size of the cross section of the chamber through which the crop material is being urged by the plunger, by adjusting the position of one or more of the chamber walls to vary the orifice through which the crop material is extruded. In most approaches, however, the width or height of the chamber is being reduced at a constant rate along the length of the chamber, which does not result in a consistent pressure on the bale, while in improved approaches (GB 972562, WO2010/100068) the bale chamber comprises two zones wherein the rate of change in cross-sectional area experienced by the bale travelling through the zones is different for those zones. Such realization provides increased resistance against which the plunger may compress the crop material to form the bale in a first zone while in a second zone just a sufficient pressure on the bale surface is maintained.

New generation high density balers, requiring systems as described above with a bend in the walls to provide enough resistance to enable the plunger to compact the crop material to higher density levels, however, face the problem of selecting the right bend, in particular the angle of those bends, especially as the use of the most aggressive baler configuration, suited for one type of crop material and certain crop conditions, might prove to be too high for other types of crop material and/or other crop conditions, resulting in discontinued operation of the system and even overloads thereof which may damage certain parts of the baler.

When looking in more detail to the problems faced with in the production of such high density bales, one observes the following. For high density baling, it is necessary to apply a profile of the highest pressure possible in the bale along the length of the compression chamber. Such high pressure profile is established by selecting the shape and orientation of one or more of the walls (side walls and/or top wall of the bale chamber). For example, concerning orientation, instead of a horizontal wall (for the top wall) or parallel with the length of the bale chamber (for the side walls), an inclination downward, or inward respectively is used. As discussed before, even more advanced approaches change the shape of a side by means of a bend, for realizing a higher inclination at the start of bale chamber, resulting in higher pressure (to compress more rapidly the crop material at the beginning of the compression cycle), and a more relaxed inclination at the end of the bale chamber, resulting in less pressure and hence bale relaxation. Again, it is to be noted that a suited pressure profile is necessary for obtaining bales with good density characteristics while avoiding too high a pressure on the plunger in order to avoid discontinued operation or breakage of one or more parts of the entire system. However, as in such high-density balers the pressure on the crop material is a lot higher than in conventional large rectangular balers, there is more slip in between the wall and the harvested material also. In order to keep the crop material inside the compression room (to obtain the maximum crop density), there is a need to increase the friction level on the walls, e.g. on the top and side walls.

While the prior-art approaches (inclined and/or bend based systems) are good attempts to realize a suited pressure profile on the bale, there is room for still better systems.

SUMMARY OF THE INVENTION

It is an object of embodiments of the present invention to provide bale chamber configurations and methods for computation thereof for realizing high density bale manufacturing. It is an advantage of systems and methods of embodiments of the present invention that they take into account the entire complexity of the design problem without neglecting cost effective manufacturability of the provided solutions.

The known solutions as described above do not address the entire problem that the designer of a bale chamber configuration is faced with. In particular for example the need to have sufficient friction on the bale is not sufficiently considered.

Indeed, the problem is to find a bale chamber configuration, that realizes a less drastic pressure drop on the bale (say in directions lying in a plane orthogonal to the length of the bale chamber), in combination with avoiding that the total pressure experienced by the plunger (say in a direction defined by the length of the bale chamber) is exceeding a certain threshold, while still having sufficient friction in order to keep the crop material inside the compression room to obtain maximum crop density. The pressure exerted upon the plunger may be defined by the sum of the pressures on all the sides of the bale chamber in addition with the dynamic friction exerted upon the bale while moving through the bale-forming chamber (all projected along the direction defined by the length of the bale chamber). It is to be noted, however, that the friction itself is also dependent on the pressure between the walls and bale (but now projected on an axis orthogonal to the wall) and even on characteristics of de side or top walls (e.g. the pattern of the inner surface.

The above objectives are accomplished by devices according to embodiments of the present invention.

The present invention relates to the use of more complex shapes of a bale chamber configuration, potentially in combination with a selection of different surface patterns on a portion of the inner surface of at least one of the walls of the bale chamber (e.g. side walls and/or top wall), forming the baling funnel along which a bale being formed is urged. It is of course clear that a theoretical optimal configuration would depend heavily on a function defining the friction and the dynamics of the bale under pressure, and that such theoretical optimal configuration might be too complex for cost effective manufacturing. Therefore, the present invention provides also for approximations of such optimal configurations. In particular embodiments, the present invention might be used in combination with parameter dependent adaptable configuration approaches as described in the co-pending application entitled "Crop parameter dependent bale chamber configuration adaption" of current applicant. In such embodiment the invention provides for an adaptable configuration by changing a bending angle, best suited for realizing the required conditions for a plurality of circumstances, instead of just for a single circumstance.

In a aspect of the present invention, a baler for manufacturing bales of harvested crop material is provided, wherein the baler comprises a bale chamber comprising a first part where a plunger can make a reciprocating movement, and a second part which cannot be reached by the reciprocating plunger. The second part comprises four walls defining a substantially rectangular opening through which a bale being formed is urged along a bale travel axis from a front end input side towards a rear end output side. The second part of the bale chamber has a varying cross section along the length of the bale chamber, whereby the rate of change of the cross section is different on at least three distinct positions along the length of the second part of the bale chamber. In this way, when compacting the crop material during bale manufacturing, a configuration along the length of the bale chamber is obtained, which may be selected to thereby establish a suited pressure profile to the bale exiting the bale chamber.

In a first embodiment thereof, at least one wall of the second part of the bale chamber comprises at least three connected sections, defining a baling funnel between the front end input side of the bale chamber and the rear end output side of the bale chamber. In the direction of the baling funnel along the length of the bale chamber, at least three of the sections are connected relative to one another other such that the rate of change of the cross section is different on at least three distinct positions along the length of the bale chamber, each position being located in a different one of said at least three sections.

In a further embodiment thereof those three sections are planar sections, each being connected under an angle relative to one another. These angles may be selected such that the rate of change of the cross section, which is the rate of change of the cross-sectional area, of the bale chamber in the zone defined by each section is different along the length of the bale chamber. The angles under which the sections are connected relative to one another differ from 0° to 180°.

In particular embodiments, the at least three sections may be connected such that along the length of the bale chamber a first zone with a first rate of change of the cross section of the bale chamber is followed by a second zone with a second rate of change of the cross section of the bale chamber being smaller than the first rate of change, the second zone being followed by a third zone with a third rate of change of the cross section of the bale chamber being smaller than the second rate of change.

In alternative embodiments, the at least three sections may be connected such that along the length of the bale chamber a first zone with a first rate of change of the cross section of the bale chamber is followed by a second zone with a second rate of change of the cross section of the bale chamber being smaller than the first rate of change, the second zone being followed by a third zone with a third rate of change of the cross section of the bale chamber higher than the second rate of change. In such embodiments, the third rate of change may be, but does not need to be, smaller than the first rate of change.

In embodiments of the present invention, at least two of the sections of at least one wall of the second part of the bale chamber may be pivotably connected to one another, so that they provide for an adaptable configuration by changing a bending angle between them.

In another embodiment of the present invention, a baler is provided wherein the at least one wall of the second part of the bale chamber has a 3D pattern at the inner side of the bale chamber. The pattern on the inner side of the bale chamber may be different in at least two distinct zones along the length of the bale chamber.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiments described hereinafter.

BRIEF DESCRIPTION OF THE DRAWINGS

The invention will now be described further, by way of example, with reference to the accompanying drawings, in which.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF THE INVENTION

The present invention will be described with respect to particular embodiments and with reference to certain drawings but the invention is not limited thereto but only by the claims.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is to be understood that embodiments of the invention may be practiced without these specific details. In other instances, well-known methods, structures and techniques have not been shown in detail in order not to obscure an understanding of this description.

Where in embodiments of the present invention reference is made to agricultural balers, reference is made to machines for forming bales from agricultural crop material, such as forming cuboid shaped bales by any suitable means, e.g. plungers.

Where in embodiments of the present invention reference is made to crop material, reference is made to any suitable type of biomass that can be harvested and packed in bales, such as for example hay, silage, straw or other.

Figure 1:
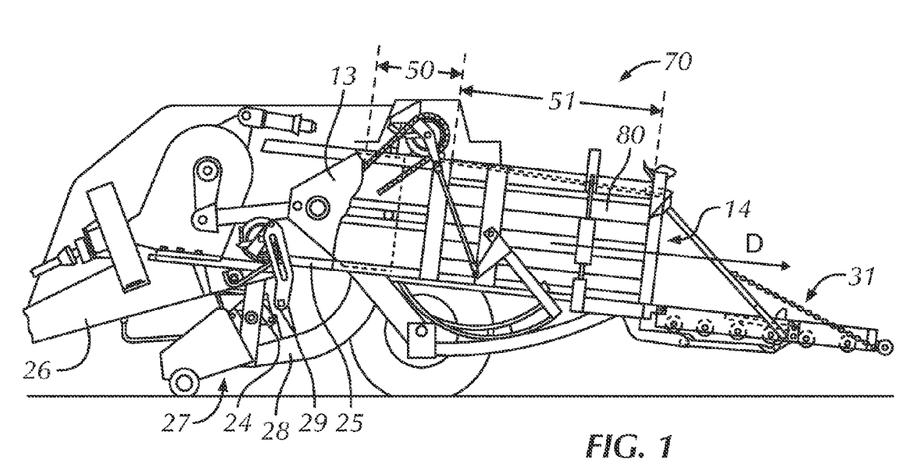
FIG. 1 illustrates a rectangular baler to which a bale chamber configuration in accordance with embodiments of the present invention can be applied.

Referring to the drawings, FIG. 1 shows an agricultural baler 70 comprising a frame 25 which is equipped with a forwardly extending tongue 26 at its front end with hitch means (not shown) for coupling the baler 70 to a towing tractor. A pick-up assembly 27 lifts windowed crop material off the field as the baler 70 is traveled thereover, e.g. while being pulled by a tractor, and delivers such material into the front end of a rearwardly and upwardly curved, charge-forming feeder duct 28. The duct 28 communicates at its upper end with an overhead, fore-and-aft extending bale chamber 80 into which crop charges are loaded by a cyclically operating stuffer mechanism 29. A continuously operating packer mechanism 24 at the lower front end of the feeder duct 28 continuously feeds and packs material into the duct 28 so as to cause charges of the crop material to take on and assume the internal configuration of the duct 28 prior to periodic engagement by the stuffer mechanism 29 and insertion up into the bale chamber 80. The feeder duct 28 may be equipped with means (not illustrated) for establishing whether a complete charge has been formed therein and operating the stuffer mechanism 29 in response thereto. Each action of the stuffer mechanism 29 introduces a "charge" or "flake" of crop material from the duct 28 into the chamber 80.

A plunger 13 reciprocates in a fore-and-aft direction within the bale chamber 80, at least within a first part 50. Biomass fed via the feeder duct 28 is thereby compacted, e.g. compressed or otherwise treated, so as to form bales in the above-described operation of the agricultural baler 70. Cuboid shaped bales are formed. The formed bales may then be moved forward by the reciprocating motion of the plunger 13 to shift serially and incrementally along the bale chamber 80 in a forward direction D towards a discharge outlet 14, wherefrom the bales may eventually be ejected. The baler 70 may furthermore comprise components such as a knotter mechanism for automatically tying the completed bales with e.g. twine or similar lineal object to make them self-supporting, for example for shipping and storage. Once tied, the bales are discharged from the discharge outlet 14 of the bale chamber 80 onto a discharge in the form of a chute, generally designated 31, for gently lowering the bales near ground level.

The invention relates to use of a particular and more complex shape of the bale chamber configuration than what is conventionally done in the state of the art. This may be combined optionally with a selection of different surface patterns on a portion of the inner surface of at least one of the walls (top wall, bottom wall, side wall), defining the baling funnel. It is of course clear that the theoretical optimal configuration would depend heavily on the function defining the friction and the dynamics of the bale under pressure, and that such theoretical optimal configuration might be too complex for cost effective manufacturing. Therefore, the invention provides also for approximations of such optimal configurations. It is to be noted also that part of the parameters (e.g. friction coefficients) might depend on the circumstances (type of crop material, crop conditions e.g. like humidity). Therefore the selected configuration will typically be selected for worst case parameters in order to be on the safe side. In the alternative the proposed invention might be used in combination with parameter dependent adaptable configuration approaches as described in co-pending application entitled "Crop parameter dependent bale chamber configuration adaption" of current applicant. In such embodiment, the invention provides for an adaptable configuration, best suited for realizing the required conditions for a plurality of circumstances, instead of just for a single circumstance.

Figure 2:
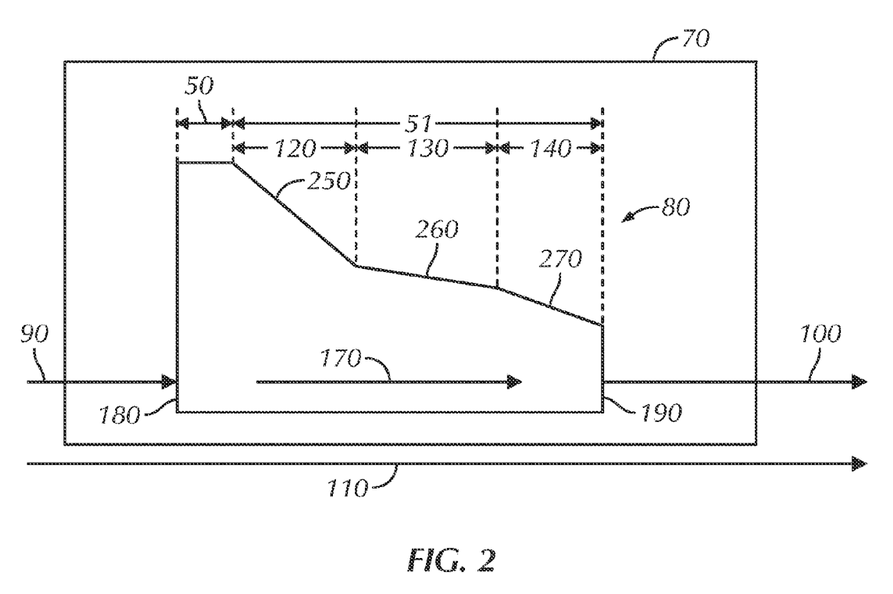
FIG. 2 shows a schematic view on the structural elements involved in an embodiment of the present invention.

FIG. 2 gives a schematic view on the structural elements involved in embodiments of the present invention. In particular a baler 70 is schematically illustrated, with a bale chamber 80 with a front end input side 180 (where the crop material is fed into the bale chamber, indicated by arrow 90) and a rear end output side 190 (where the manufactured bales are ejected out of the machine, indicated by arrow 100). The bale chamber 80 comprises a first part 50 where a plunger 13 can make a reciprocating movement, and a second part 51 which cannot be reached by the reciprocating plunger 13. The bale chamber 80, in the second part, has a varying cross section along the length direction 110 of the bale chamber 80, in a direction defined by the baling funnel 170. In the embodiment illustrated, the varying cross section of the bale chamber 80 is provided by the particular configuration of the top wall of the bale chamber 80. This, however, is not intended to be limiting for the present invention. In alternative embodiments, the varying cross section of the bale chamber 80 could for example be provided by the particular configuration of one or more of the side walls.

A baler 70 according to embodiments of the present invention, as illustrated in FIG. 2, comprises a bale chamber 80 with a particular configuration along the length direction 110 of the bale chamber 80. In the embodiment illustrated, the wall of the second part 51 of the bale chamber 80 comprises three connected sections 250, 260, 270 which, along the length of the bale chamber 80 are connected to each other such that the rate of change of the cross sections is different on at least three different positions along the length direction 110 of the bale chamber 80. In the embodiment illustrated, the three sections 250, 260, 270 divide the second part 51 of the bale chamber 80 into three zones: a first zone 120, a second zone 130 and a third zone 140. It can be appreciated from the schematic drawing of FIG. 4 that the rate of change of the cross section of the bale chamber 80 in the first zone 120 is different from the rate of change of the cross section in the second zone 130 and in the third zone 140.

The actual configuration of the walls of the second part 51 of the bale chamber 80 may be selected to thereby establish a suited pressure profile to the bale exiting the bale chamber 80 when compacting the crop material during bale manufacturing.

Figure 3A:
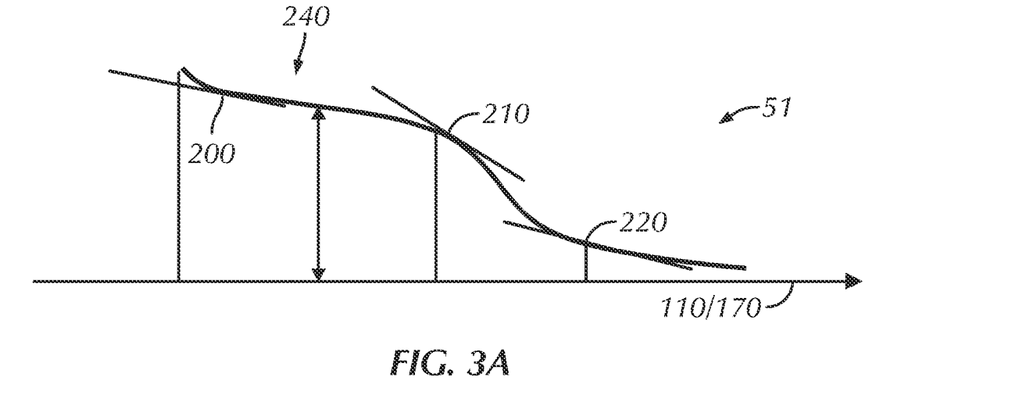
FIG. 3a, FIG. 3b and FIG. 3c diagrammatically show three different configurations of the second part of a bale chamber, having a varying cross section along the length of the bale chamber whereby the rate of change of the three cross sections is different on at least three distinct positions along the length of the bale chamber, in accordance with embodiments of the present invention.
Figure 3B:
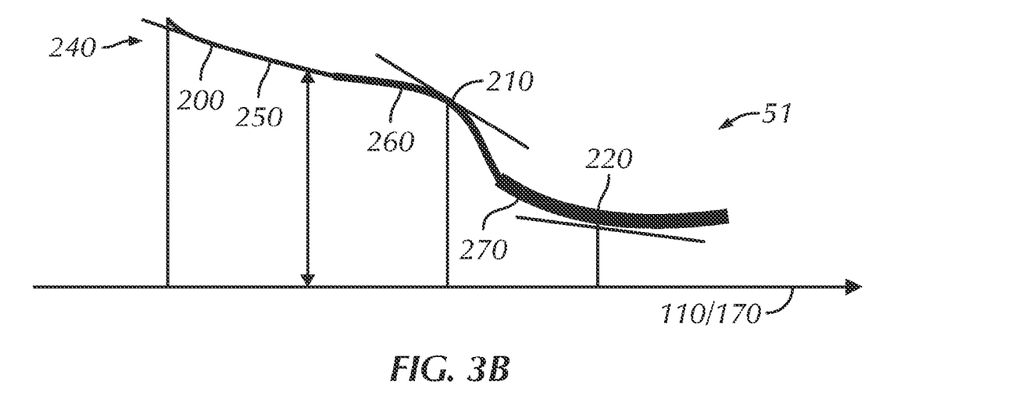
Figure 3C:
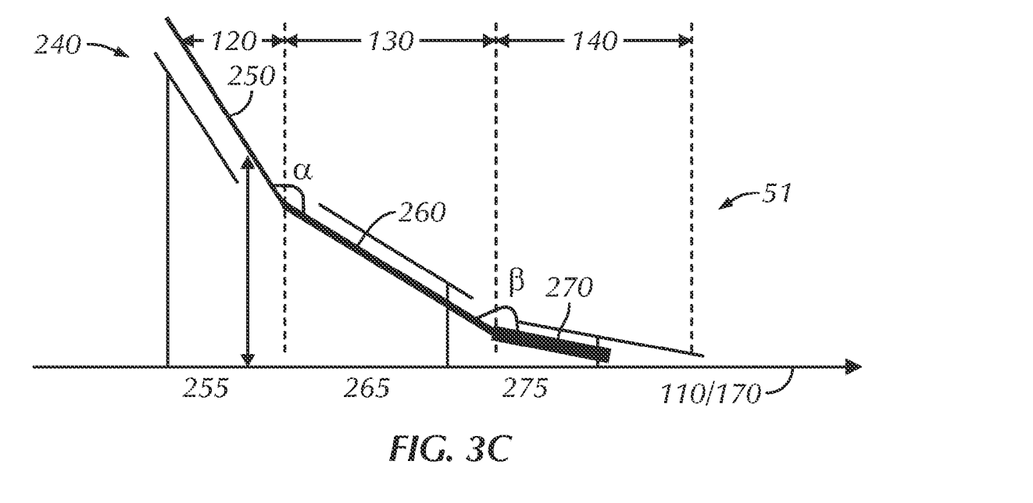

FIG. 3a, FIG. 3b and FIG. 3c schematically illustrate different embodiments of walls as may be used in a bale chamber 80 of a baler 70 in accordance with embodiments of the present invention. All three embodiments only illustrate a portion of the second part 51 of the bale chamber 80, more particularly one wall thereof, for example a top wall or a side wall, which is such that it provides to the second part 51 of the bale chamber 80 a varying cross section along the length direction 110 thereof.

In the embodiment illustrated in FIG. 3a, the wall 240 has a smoothly varying surface, which provides a rate of change of the cross sections of the second part 51 of the bale chamber 80 to be different in at least three distinct positions along the length of the bale chamber 80. Three such positions are, as an example only, indicated by reference numbers 200, 210 and 220. It is to be noted that a line tangential to the wall 240 in these points is indicative for the rate of change of the cross section of the bale chamber 80 at that point. As the tangential lines in these points have a different slope, different rates of change are obtained at these points.

In embodiments where the wall 240 has a smoothly varying surface, bents in the wall 240 can be made e.g. by bending a plate forming the wall 240.

In an embodiment, as for example shown in FIG. 3b, the wall 240 of the second part 51 of the bale chamber 80 comprises a plurality of, in the embodiment illustrated three, connected sections 250, 260, 270, connected to each other so as to define a baling funnel 170 between the front end input side 180 of the bale chamber 80 and the rear end output side 190 of the bale chamber 80. There is a discontinuous transition from one section to a neighboring section. Two neighboring sections may be made from one plate which has been folded, so as to form a crease in between the two neighboring sections. Alternatively, the sections may be connected to one another by welding, by gluing, by bolting or in any other suitable manner. Yet alternatively, the sections may be hingedly connected to one another.

In the direction 110 of the baling funnel 170, at least three of the sections 250, 260, 270 are connected relative to each other such that the rate of change of the cross sections is different in at least three distinct positions along the length direction 110 of the bale chamber 80, each position lying in a different one of said at least three sections. Again, in FIG. 3b, lines tangential to the wall 240 are shown for three points 200, 210, 220, one on each of the sections, and as the slopes of these lines are different, the rate of change of the cross section of the bale chamber 80 is different at each of the three points 200, 210, 220.

In another embodiment, as for example shown in FIG. 3c, the wall 240 of the second part 51 of the bale chamber 80 also comprises a plurality of, in the embodiment illustrated three, connected sections 250, 260, 270, but in this embodiment those three sections 250, 260, 270 are planar sections. The planar section 250, 260, 270 are connected to one another under an angle α,β relative to each other. Each section 250, 260, 270 defines a zone 120, 130, 140 of the second part 51. By using planar sections 250, 260, 270, the rate of change of the cross section of the bale chamber 80 in the entire zones 120, 130, 140 defined by each section 250, 260, 270 is different from the rate of change of the cross section of the bale chamber 80 in another zone 120, 130, 140 along the length direction 110 of the bale chamber 80.

In particular embodiments of the present invention, as for example illustrated in FIG. 3c, the rate of change of the cross section of the bale chamber 80 in the first zone 120 may be larger than the rate of change of the cross section of the bale chamber 80 in the second zone 130, which in turn may be larger than the rate of change of the cross section of the bale chamber 80 in the third zone 140. This way, crop material entering the second part 51 of the bale chamber 80 will first be aggressively compressed in the first zone 120, and, while progressing through the bale chamber 80 will be less aggressively compressed in the second zone 130, and will experience just sufficient pressure to be held together at a high density in the third zone 140.

In alternative embodiments of the present invention, the rate of change of the cross section of the bale chamber 80 in the first zone may be larger than the rate of change of the cross section in the second zone, and the rate of change of the cross section in the third zone may again be larger than the rate of change of the cross section in the second zone. Such configuration provides a zone of compression (first zone), where crop material is heavily compressed, followed by a zone of expansion (second zone), where crop material is allowed to somewhat relax, and then again followed by a zone of compression (third zone), where the crop material is again compressed. Preferably this third region is then again followed by a zone of expansion (fourth zone, not illustrated in previous drawing), where the crop material is again allowed to relax somewhat, and which is present to hold the bale together in compressed state before binding.

Figure 4:
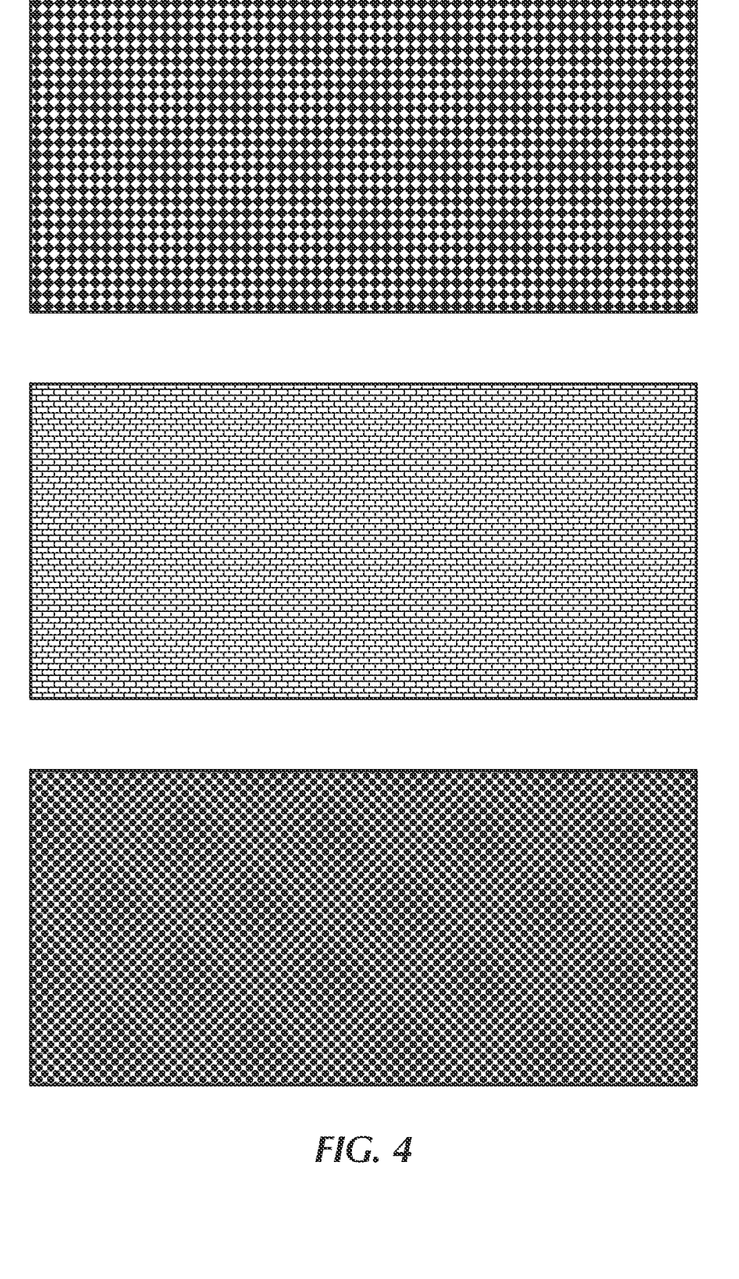
FIG. 4 shows 2D images of examples of 3D patterns which may be applied at one or more portions of a wall of a second part of a bale chamber, in accordance with embodiments of the present invention.

In accordance with embodiments of the present invention, at least one wall may be provided with a pattern, for example a 3D pattern at the inner side of the bale chamber 80. Such 3D pattern functions as friction elements, for providing more friction to a bale passing by. The 3D pattern in general may be formed by irregularities on the surface of an operative structure like a wall of the second part 51 of the bale chamber 80, such that the ruggedness thereof is increased. The 3D pattern may for example be formed by shapes stamped into the metal of which the wall is made. Example patterns are shown in FIG. 4. As examples, diamond shapes, rectangles and bubbles are shown in the 2D representation of the 3D pattern, the present invention, however, not being limited to these shapes. As examples, the 3D patterns may comprise or consist of (parts of) pyramids, (parts of) cylinders and/or (parts of) spheres, the invention again not being limited thereto. Alternatively, the 3D pattern may be provided by a plurality of inwardly projecting projections adapted to frictionally grip the sides of a bale passing by through the bale chamber 80, so as to provide greater resistance to movement of the bale towards the rear end output side 190, without applying excessive side pressure to the bale.

Figure 5:
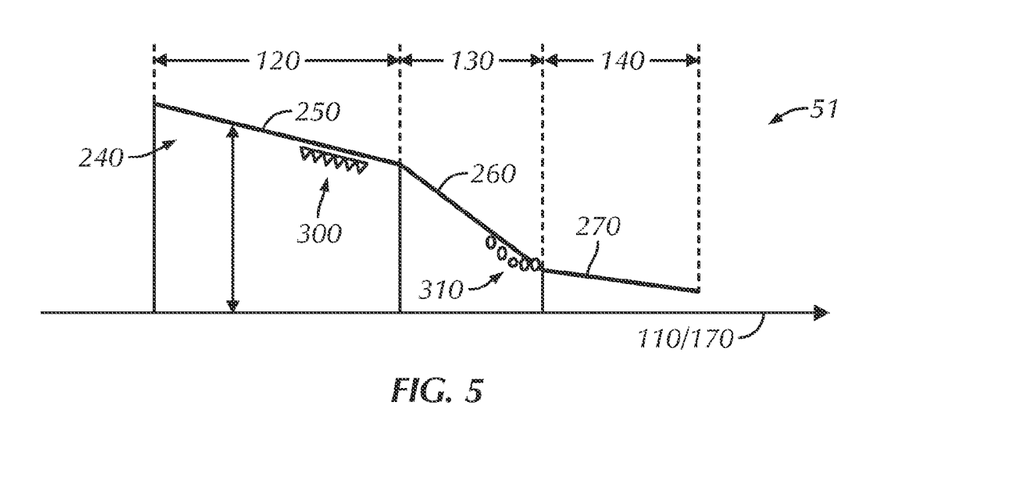
FIG. 5 shows a configuration profile of a section of the second part of a bale chamber wherein the pattern of the inner side of the bale chamber is different in at least two distinct zones along the length of the bale chamber, in accordance with embodiments of the present invention.

FIG. 5 shows an example of a configuration of a wall 240 of a second part 51 of a bale chamber 80, comprising three straight sections 250, 260, 270. A 3D pattern 300, 310 is provided on the inner side of the bale chamber 80, in the embodiment illustrated only at two distinct locations. In the example illustrated the type of pattern 300, 310 is different in at least two distinct zones along the length of the bale chamber 80, thus providing different gripping or friction properties at different locations.

Figure 6:
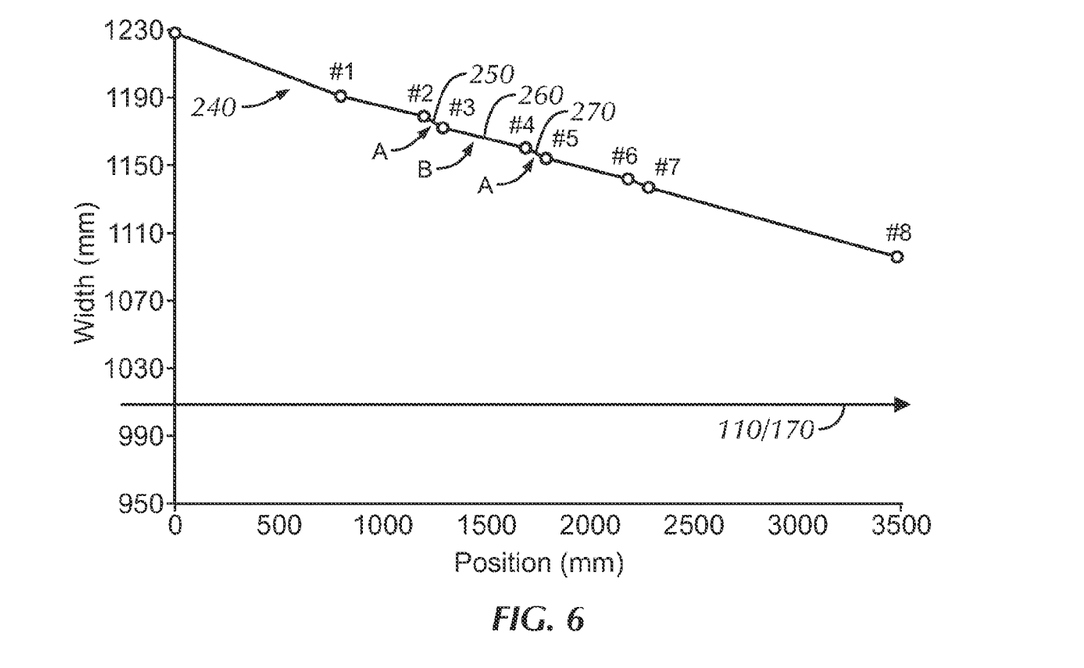
FIG. 6 illustrates a configuration profile of a section of the second part of a bale chamber (e.g. the top portion) in accordance with embodiments of the present invention.

In another embodiment shown in FIG. 6 (with or without combination with pattern selection) the at least three sections 250, 260, 270 are connected such that along the length direction 110 of the bale chamber 80 a first zone 120 with a first rate of change of the cross section of the bale chamber 80 is followed by a second zone 130 with a second rate of change of the cross section of the bale chamber 80 smaller than said first rate of change, and the second zone 130 is followed by a third zone 140 with a third rate of change of the cross section of the bale chamber 80 higher than the second rate of change but smaller than the first rate of change. The end result is a bale chamber 80 with a wall 240, made of sections that are more aggressively compressing crop material (A), followed by sections that are smoother (B). The more aggressive sections A are gradually getting smoother along the wall in view of the higher pressure from the compacted crop material. In further embodiments, 3D patterning of at least some of the sections may be added, for example 3D patterning of one or more of the smoother sections B.

The embodiment illustrated in FIG. 6 is shown in a representation showing on the left (vertical axis) the dimensions of the cross section of the bale chamber 80 and on the bottom (horizontal axis) the position of each part along the length direction of the bale chamber 80. It can be seen that in this embodiment the wall 240 of the second part 51 comprises eight sections connected to one another under different angles.

In another embodiment of the present invention, (not illustrated in the drawings), the bale chamber 80 comprises a plurality of connected sections 250, 260, 270 of which at least two are pivotably connected with respect to one another other. Those pivots can e.g. be located at the connection ribs between two neighboring sections. The pivotability of two neighboring sections allows for reconfigurability of the wall, by changing an angle included between two neighboring sections. This way, the aggressivity of compression in a compression zone and/or the degree of relaxation in an expansion zone can be changed (for example using an hydraulic or electric actuator). Such change can for example be implemented based on a crop parameter such as crop type, humidity of the crop material being harvested, etc.

In alternative embodiments of the present invention where a wall 240 comprises a plurality of sections, such sections can be fixedly connected to one another, e.g. by welding or by bolting. Or, yet alternatively, two neighboring sections can be made from a single plate, a discontinuous transition being provided in the plate between the two neighboring sections, e.g. by folding.

Bents, e.g. a discontinuous transition between neighboring sections, in the walls of the second part 51 of the bale chamber 80 can be applied to top and side walls simultaneously. In embodiments of the present invention, such bents in different walls can be aligned with respect to the length direction 110 of the bale chamber 80. In alternative embodiments, bents in one of the walls are not aligned with bents in at least one other wall of the bale chamber 80.

In accordance with embodiments of the present invention, the number of bents in a wall, hence the number of sections of a wall, could become very large, e.g. more than 10, such as more than 20, even more than 50 or even more than 100. In this case, very short sections B (smooth sections) could be provided in between every two neighboring compression sections A. A section is a smooth section if this section compresses crop material less aggressively than a neighboring section.

The present invention also provides for methods for determining an improved or optimized configuration of a bale chamber, for use in a baler for manufacturing bales of harvested crop material. The method comprises a step of receiving a required pressure to the bale exiting the bale chamber when compacting the crop material during bale manufacturing, a required friction between the bale and the bale chamber inner surface and a maximum acceptable pressure on the plunger; a further step of receiving physical parameters related to the behavior of the harvested crop material under pressure and the friction between the bale and the inner surface of the bale chamber; a further step of receiving design parameters of the bale chamber; a step of determining for a first configuration of the bale chamber the achieved pressure to the bale along the length direction of the bale chamber, and the achieved friction between bale and inner surface of the bale chamber, and the total pressure on the plunger by combining the physical parameters with the geometric information of the first configuration; a step of comparing such determined pressure, friction and total plunger pressure values with the required determined pressure, friction and total plunger pressure values and if required, e.g. if one of the determined values exceeds a maximum acceptable value, or if the required pressure is not obtained, a step of selecting another configuration with a modified geometry and repeating the steps of determining, comparing and modifying until an acceptable result is found.

Figure 7:
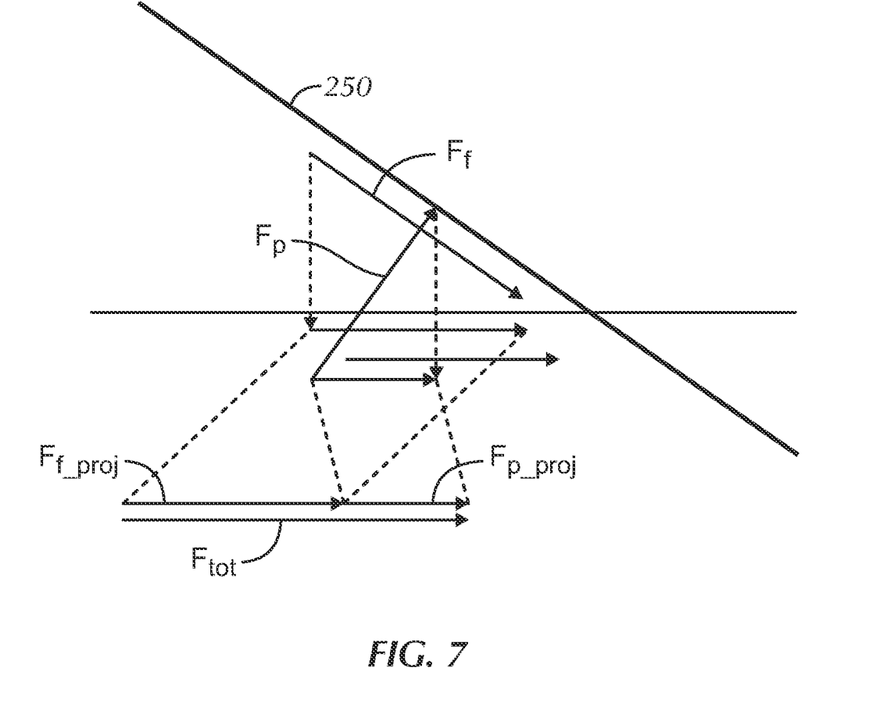
FIG. 7 illustrates forces acting in the second part of a bale chamber.

FIG. 7 shows the different forces involved in the overall process and the different projections needed in the computations. FIG. 7 shows a single section 250 of a wall 240 of a second part 51 of a bale chamber 80. The force $F_{tot}$ is the force contributing to the total experienced pressure (to be obtained as an integral over the entire bale length) on the plunger 13, in the direction defined by the length direction 110 of the bale chamber 80. This force comprises the friction force $F_f$ acting on the bale by friction between the wall and the bale, as projected ($F_{f\_proj}$) and the pressure force $F_p$ on the bale by the wall 240 exerting pressure on the bale, also as projected ($F_{p\_proj}$).

In an embodiment thereof, the steps of receiving, determining and comparing are performed by a computer system. The presented method can be implemented as a computer implemented method on any computer system, e.g. general purpose computer system, in any suitable software language or command-script (e.g. Fortran, Pascal, C, C++, Matlab) or embedded in existing spreadsheet program (e.g. Excel). It is one of the contributions of the invention to recognize that the complicated problem faced with, in particular the multiple objectives that have to be met, say, a hard constraint on plunger pressure (maximum), a hard constraint on friction (minimum) and an objective along the length of the bale chamber on the pressure experienced by the bale (as high as possible), in combination with phenomena with complicated models (friction, reaction of the harvested crop material when baled) and the geometric aspects (projections) of the problem, requires a systematic approach, which makes it suited for computer assisted realizations. Furthermore it is a contribution of the invention to realize that a more in-depth treatment of the problem leads to more complicated profiles.

In a further embodiment thereof also the step of selecting another configuration (e.g. represented by a finite element method) may be performed by a computer system. Finding an improved or optimal configuration is a multi-objective multi-constraint optimization problem in a multi-parameter space (indeed a configuration can be defined as a plurality of positions along the length of the bale chamber). Using optimization algorithms for steering the search towards a configuration might therefore be necessary. It is to be noted that not necessary an optimal continuous curve is searched for. One might preselect some characteristics of the configuration (e.g. a few planar sections) and e.g. limit the exploration to the determining of the angles between them or the angle and length of each section. It is to be noted that in case a configuration is searched for which can be used with a variable configuration technique, in essence just more constraints are added, in particular the constraints for each configuration.

In particular embodiments, the present invention might be used in combination with parameter dependent adaptable configuration approaches as described in the co-pending application entitled "Crop parameter dependent bale chamber configuration adaption" of current applicant. In such embodiment the invention provides for an adaptable configuration by changing a bending angle, for example made possible by hinges between the different sections, thus forming bents, best suited for realizing the required conditions for a plurality of circumstances, instead of just for a single circumstance.

The invention claimed is:

1. A baler for manufacturing bales of harvested crop material, the baler comprising:
a reciprocating plunger;
a bale chamber comprising a first part where the plunger can make a reciprocating movement, and a second part which cannot be reached by the reciprocating plunger, the second part comprising four walls defining a generally rectangular opening through which a bale being formed is urged along a bale travel axis from a front end input side towards a rear end output side,
wherein the second part has a varying cross section along a length direction of the bale chamber and at least one wall of the second part comprises at least three connected planar sections, whereby along the length direction of the bale chamber at least three of the sections are connected under an angle relative to each other, these angles being selected such that the rate of change of the cross section f the bale chamber in a zone defined by each section is different on at least three distinct positions along the length direction of the bale chamber, each position lying in a different one of said at least three sections, and wherein at least two of the sections are pivotally connected with respect to one another.

2. A baler according to claim 1, wherein the at least three sections are connected such that along the length direction of the bale chamber a first zone with a first rate of change of the cross section of the bale chamber is followed by a second zone with a second rate of change of the cross section of the bale chamber being smaller than said first rate of change, the second zone being following by a third zone with a third rate of change of the cross section of the bale chamber smaller than the second rate of change.

3. A baler according to claim 1, wherein the at least three sections are connected such that along the length direction of the bale chamber a first zone with a first rate of change of the cross section of the bale chamber is followed by a second zone with a second rate of change of the cross section of the bale chamber being smaller than said first rate of change, the second zone being following by a third zone with a third rate of change of the cross section of the bale chamber higher than the second rate of change.

4. A baler according to claim 3, wherein the third rate of change is smaller than the first rate of change.

5. A baler according to claim 1, wherein at least one wall is provided with a 3D pattern at the inner side of the bale chamber.

6. A baler according to claim 5, wherein the 3D pattern is different in at least two distinct zones of the bale chamber.

* * * * *